United States Patent [19]
Turra et al.

[11] Patent Number: 5,275,527
[45] Date of Patent: Jan. 4, 1994

[54] DEVICE FOR FEEDING STACKS OF CUTOUTS TO A USER MACHINE

[75] Inventors: Mario Turra, Casalecchio Di Reno; Armando Neri, Bologna, both of Italy

[73] Assignee: G.D. S.p.A., Bologna, Italy

[21] Appl. No.: 913,090

[22] Filed: Jul. 14, 1992

[30] Foreign Application Priority Data

Jul. 29, 1991 [IT] Italy ............... 000286 A/91

[51] Int. Cl.⁵ ............................................. B65G 59/00
[52] U.S. Cl. ................................. 414/795.8; 414/792
[58] Field of Search ............ 414/795.8, 796, 796.8, 414/796.9

[56] References Cited

U.S. PATENT DOCUMENTS

| | | | |
|---|---|---|---|
| 3,884,363 | 5/1975 | Ajiouny | 414/792 |
| 5,074,745 | 12/1991 | Neri | 414/795.8 |
| 5,092,730 | 3/1992 | Neri | 414/331 |

FOREIGN PATENT DOCUMENTS 0232529 8/1987 European Pat. Off. .
0411523 2/1991 European Pat. Off. .

OTHER PUBLICATIONS

Patent Abstracts of Japan—vol. 10, No. 189 (M-494)(2245) 3 Jul. 1986 & JP-A-61 33 427 (Motoda Electronics Co.)-17 Feb. 1986.

*Primary Examiner*—David H. Bollinger
*Assistant Examiner*—Carol Wallace
*Attorney, Agent, or Firm*—Guido Modiano; Albert Josif

[57] ABSTRACT

The device for automatically feeding stacks of cutouts to a user machine comprises an inclined supporting surface which is suitable to receive in succession the stacks and supports a guide on which a trolley can slide; the trolley is provided with a supporting element for a stack to be fed to the machine; an unloading station is defined on the supporting surface and is provided with a stop device which is suitable to be crossed by the trolley; a loading device is provided with a lifting element which can move between a lowered position, at a station for the removal of a stack, and a raised position, at an output station, in which the lifting element is engaged by the supporting element of the trolley so as to cause the extraction of the stack from the lifting element.

6 Claims, 1 Drawing Sheet

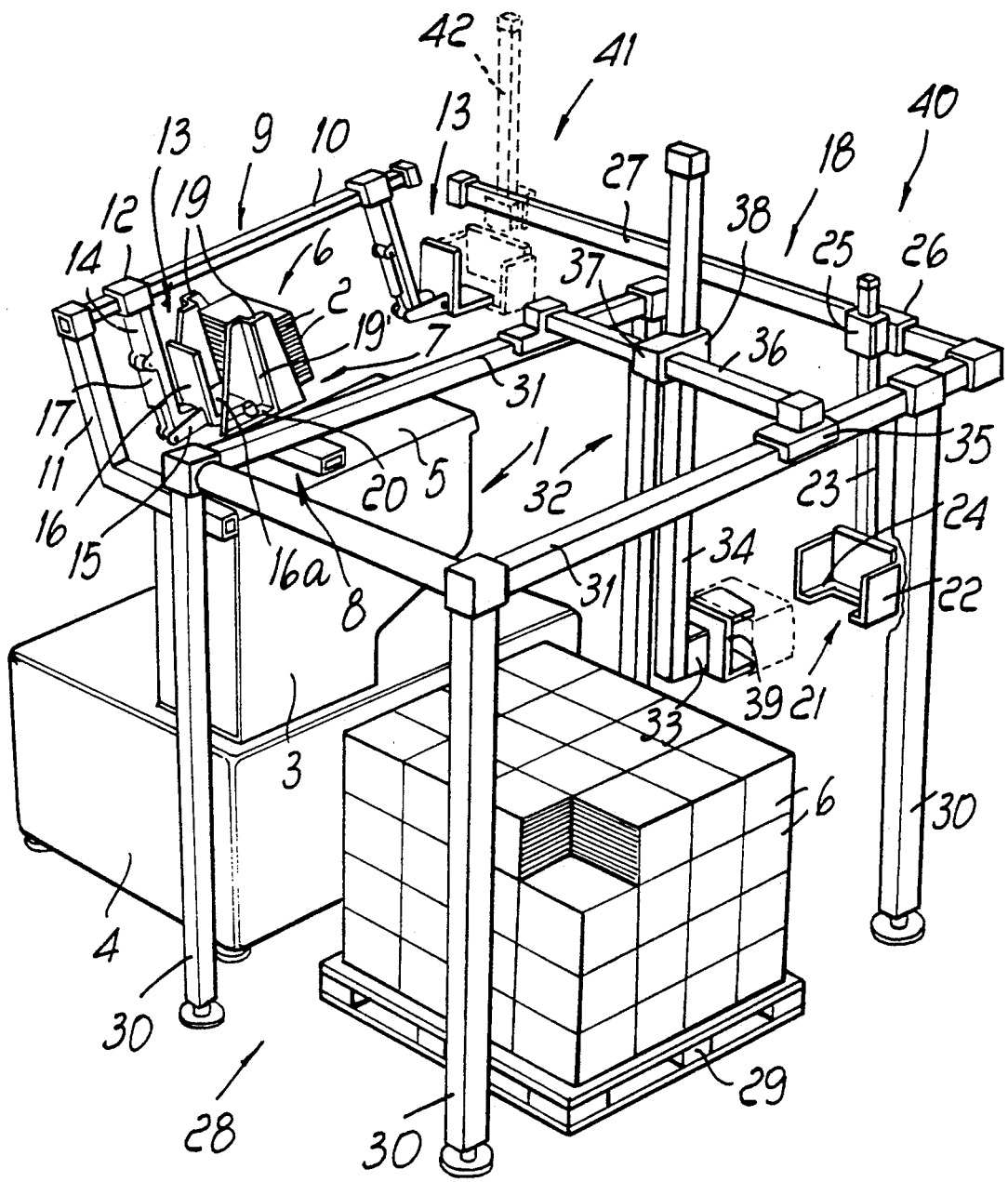

DEVICE FOR FEEDING STACKS OF CUTOUTS TO A USER MACHINE

BACKGROUND OF THE INVENTION

The present invention relates to a device for feeding stacks of cutouts to a user machine.

More particularly, the present invention relates to a device for automatically feeding stacks of cardboard cutouts to a machine for producing boxes for containing cartons, which in turn contain packets of cigarettes.

It is known that packaging machines of the above mentioned type are fed with stacks of cardboard cutouts destined to constitute the outer container of the packages.

In particular, the stacks of cutouts are supplied in an orderly arrangement, in layers formed by a plurality of parallel rows, on conventional pallet-like supporting means. The stacks of cutouts are then transferred to a conveyor, arranged at a relatively high location which feeds the cutouts to the user machine.

Feeding of the user machine is generally rather difficult, unless robotized means are used to remove and raise the stacks of cutouts up to the elevated conveyor. This latter solution, however, is significantly onerous in terms of cost.

SUMMARY OF THE INVENTION

The aim of the present invention is to overcome the problems encountered in the prior art devices.

Within this aim, an object of the invention is to solve the above described problem by means of a device which automatically feeds stacks of cutouts to a user machine in an easy and relatively economical manner.

According to the present invention, a device for automatically feeding stacks of cutouts to a user machine is provided, characterized in that it comprises an unloading station for receiving in succession stacks of cutouts in input to said user machine, a trolley provided with a supporting element for a stack to be fed to said unloading station, means for guiding said trolley along a preset path, a loading device provided with a lifting element movable between a lowered position, at a station for the removal of a stack of cutouts, and a raised position, at an output station, said lifting element being suitable, in said raised position, to be engaged by said trolley supporting element so as to cause the extraction of said stack from said lifting element.

BRIEF DESCRIPTION OF THE DRAWINGS

The invention will now be described with reference to the accompanying drawing, which illustrates a non-limitative example of embodiment thereof and is a perspective view of the device for feeding stacks of cutouts according to the present invention.

DESCRIPTION OF THE PREFERRED EMBODIMENTS

With particular reference to said figure, the reference numeral 1 generally designates a user machine intended to be fed with cutouts 2. The machine 1 comprises a housing 3 supported by a base 4 and upwardly delimited by an inclined supporting surface 5. Known unloading means, not illustrated, are provided above the surface 5; by virtue of said unloading means, the cutouts 2 are removed in succession from the bottom of a stack 6 which is arranged above said surface 5 in contact with a stop device 7 and at an unloading station 8.

The stop device 7 is part of an automatic device for feeding the cutouts 2 to the machine 1, which is generally designated by the reference numeral 9 and is described in U.S. patent application Ser. No. 07/756,704 filed Sep. 9, 1991 by the same Assignee, which is referenced in full for the sake of completeness in description.

The device 9 comprises a guide 10 which extends parallel to the surface 5 and is supported, at its lower end, by a bracket 11 which is substantially L-shaped and is rigidly associated with the lower end of the surface 5.

A slider 12 for suspending a trolley 13 is slideably mounted on the guide 10; said trolley comprises a rod 14 which extends toward the surface 5 in a direction which is substantially perpendicular to said surface 5. A substantially L-shaped supporting element 16, directed toward the upper end of the surface 5, is pivoted to the rod 14 at its free end, at a preset distance from the surface 5, about an axis 15 which is parallel to the surface 5 and is transverse to the axis of the guide 10.

The supporting element 16 can rotate, by virtue of the action of a conventional actuation element 17 (e.g. a fluid-activated cylinder), between a transfer position, wherein its flat bottom 16a is parallel to the surface 5, and a loading position, wherein said bottom 16a is arranged horizontally and is directed toward the output region of a device for loading the stacks 6, generally designated by the reference numeral 18.

The stop device 7 comprises a pair of profiled elements 19 which are fixed to the surface 5 by means of respective feet 20 and extend toward the guide 10. Said profiled elements 19 are mutually spaced and have respective shoulders 19' arranged on a plane which is perpendicular to the guide 10, at a selected distance from one another which is smaller than the selected transverse dimension of the stacks 6.

The loading device 18 comprises a lifting element 21 constituted by a fork-like member 22 fixed to the lower end of a vertical rod 23; the fork 22 has such dimensions as to receive a stack 6 of cutouts 2 and has, on its bottom, an opening 24 in which the bottom 16a of the supporting element 16 can be inserted, as specified hereinafter.

The rod 23 is guided so that it can slide, under the actuation of conventional actuation elements which are not shown, in a sleeve 25 which is rigidly associated with a slider 26. Said slider 26 is in turn guided so that it can slide, under the actuation of actuation elements which are not illustrated, along a cross-member 27, which is arranged horizontally and transversely to the axis of the guide 10 and extends above the upper end of the upper surface 5 of the machine 1.

The cross-member 27 is rigidly associated with the fixed frame of an apparatus, generally designated by the reference numeral 28, for removing the stacks 6 of cutouts 2 from pallet-like supporting means 29. Said fixed frame comprises two pairs of uprights 30 which rise symmetrically along the vertices of a quadrilateral and are provided, at their tops, with a pair of members 31 which are arranged horizontally and parallel to each other. A unit for the removal and transfer of the stacks 6, generally designated by the reference numeral 32, can move horizontally on the members 31.

The removal and transfer unit 32 has a head 33 mounted at the lower end of a vertical member 34. The members 31 slidingly support respective sliders 35 which are mutually connected by a movable cross-member 36 and can be actuated by virtue of appropriate conventional actuation elements which are not illustrated. The movable cross-member 36 slidingly supports a sleeve 37 which can be actuated by an appropriate conventional actuation element which is not shown in the drawing; a further sleeve 38 is rigidly coupled to the sleeve 37 and is perpendicular thereto; the vertical member 34 is slidingly mounted in said sleeve 38 and can be actuated by a conventional actuation element which is not illustrated.

The removal head 33 is provided with an element 39 for gripping the stacks 6 of cutouts 2. If the stacks 6 to be removed are bound by a respective strap, said grip element 39 is provided, in a manner which is known and thus not illustrated in detail in the drawing, with sucker means acting on said strap by aspiration. If instead the stacks 6 have no straps, the grip element 39 has a horizontal supporting lamina which extends below the head 33 and is insertable below the stack 6 to be removed from the pallet 29.

The operation of the described device is as follows.

The stack 6 to be fed to the machine 1 is removed from the pallet 29 by means of the grip element 39 which is supported by the head 33 of the removal unit 32. Said removal head 33 is movable along three orthogonal axes, and can thus be positioned exactly at the stack 6 to be transferred and then lowered in front of said stack. The movements of the head 33 are controlled by an appropriate control unit (not shown) of the known self-learning type normally used on three-axis measurement machines.

The stack 6 removed by the grip element 39 is then transferred inside the fork 22 of the lifting element 21 of the loading device 18. During this step, the lifting element 21 is in a lowered position at a removal station designated by the reference numeral 40.

The lifting element 21 is moved to the raised position and subsequently transferred to an output station 41 by sliding along the cross-member 27. In said station 41, the lifting element 21 is in the configuration shown by the broken lines 42.

The stack 6 is removed from the output station 41 of the loading device 18 by means of the trolley 13 in order to be fed to the unloading station 8 of the feeder device 9. For this purpose the trolley 13 is moved toward the station 41 along the guide 10, with the supporting element 16 arranged in the loading position. When the trolley 13 reaches the upper end of the guide 10, i.e. at the output station 41 of the loading device 18, the element 16 is inserted below the fork 22 so that its bottom 16a engages the opening 24 of said fork 22.

At this point, the actuator 17 is actuated so as to rotate said element 16 about the axis 15 in order to move it to the transfer position and raise the stack 6 from said fork 22. The trolley 13 is then actuated again in order to move the stack 6 into the unloading station 8, at which said stack 6 is retained by the profiled elements 19 of the stop device 7.

Once the stack 6 has been abandoned, the trolley 13 advances beyond the unloading station 8, passing between the profiled elements 19, and stops in a stroke limit position at the lower end of the guide 10.

When the height of the stack fed to the machine 1 decreases below a preset value, a conventional sensor, not shown, actuates the trolley 13 which is moved toward the loading device 18 in order to feed a new stack 6 of cutouts. Naturally, said new stack is fed by the trolley 13 above the previous stack which is about to end.

To conclude, the described device allows to simply solve the problem of feeding stacks of cardboard cutouts to a user machine of the type used to package cigarette cartons and the like.

We claim:

1. Device for automatically feeding stacks of cutouts to a user machine, comprising an unloading station for receiving in succession stacks of cutouts in input to said user machine, a trolley having a supporting element for a stack to be fed to said unloading station, means for guiding said trolley along a preset path, a loading device having a lifting element movable between a lowered position, at a station for the removal of a stack of cutouts, and a raised position, at an output station, said lifting element being suitable, in said raised position, to be engaged by said supporting element of the trolley, said supporting element being rotatable between a loading position for extracting said stack from said lifting element and a transfer position for feeding said stack to said unloading station.

2. Device according to claim 1, wherein said unloading station comprises a stop device, said stop device having profiled elements which are mutually spaced according to a selected distance for allowing said supporting element of said trolley to pass between them, said stacks having a selected transverse dimension thereby said stop device retaining said stacks in said unloading station.

3. Device according to claim 1, wherein said lifting element is constituted by a fork-like element which is fixed to the lower end of a vertical rod and has, on its bottom, an opening in which a flat bottom of said supporting element can be inserted.

4. Device according to claim 1, wherein said lifting element is constituted by a fork-like element which is fixed to the lower end of a vertical rod being slideably guided in a sleeve which is rigidly associated with a slider, said slider being slidingly guided along a cross-member which is arranged horizontally and transversely to the axis of said guide.

5. Device for automatically feeding stacks of cutouts to a user machine, comprising an unloading station for receiving in succession stacks of cutouts in input to said user machine, a trolley provided with a supporting element for a stack to be fed to said unloading station, means for guiding said trolley along a preset path, a loading device provided with a lifting element movable between a lowered position, at a station for the removal of a stack of cutouts, and a raised position, at an output station, said lifting element being suitable, in said raised position, to be engaged by said supporting element of the trolley so as to cause the extraction of said stack from said lifting element, and wherein said trolley comprises a road which extends from a slider slideable on said guiding means, said supporting element being substantially L-shaped and pivoted at the free end of said rod about an axis which is transverse to the axis of said guiding means, said supporting element being directed toward said output station.

6. Device for automatically feeding stacks of cutouts to a user machine, comprising an unloading station for receiving in succession stacks of cutouts in input to said user machine, a trolley provided with a supporting element for a stack to be fed to said unloading station, means for guiding said trolley along a preset path, a loading device provided with a lifting element movable between a lowered position, at a station for the removal of a stack of cutouts, and a raised position, at an output station, said lifting element being suitable, in said raised position, to be engaged by said supporting element of the trolley so as to cause the extraction of said stack from said lifting element, a head which can be moved along three orthogonal axes, a grip element, which is part of said head, for removing stacks from pallet-like supporting means and for transferring said stacks to said lifting element at said station for removal of a stack.

* * * * *